United States Patent [19]
Pastecki et al.

[11] Patent Number: 5,514,216
[45] Date of Patent: May 7, 1996

[54] APPARATUS FOR HOLDING SOLID COMPACT MEDICAMENTS DURING COATING PROCESSING

[75] Inventors: Peter A. Pastecki; Thomas C. Reiter; Charles W. Pierson, all of Rochester, N.Y.

[73] Assignee: Bayer Corporation (formerly Miles, Inc.), Parsippany, N.J.

[21] Appl. No.: 88,500

[22] Filed: Jul. 7, 1993

[51] Int. Cl.⁶ ..................................... B05C 13/02
[52] U.S. Cl. ..................... 118/503; 118/30; 118/500; 269/43; 269/224; 269/254 CS; 269/287
[58] Field of Search ..................... 118/500, 503, 118/30; 269/287, 43, 254 CS, 224; 427/2.14, 2.22, 2.23; 53/140, 560, 454; 211/89

[56] References Cited

U.S. PATENT DOCUMENTS

| | | | |
|---|---|---|---|
| 599,865 | 3/1898 | Richards | 427/2.22 |
| 2,390,337 | 12/1945 | Spotz | 18/19 |
| 2,878,630 | 3/1959 | Stirn et al. | 53/182 |
| 3,038,282 | 6/1962 | Hansen et al. | 53/28 |
| 3,173,840 | 3/1965 | Hostetler et al. | 167/83 |
| 3,333,031 | 7/1967 | Vincent, Jr. et al. | 264/15 |
| 4,817,367 | 4/1989 | Ishikawa et al. | 53/454 |
| 4,884,602 | 12/1989 | Yamamoto et al. | 141/242 |
| 4,921,108 | 5/1990 | Berta | 209/625 |
| 4,965,089 | 10/1990 | Sauter et al. | 427/3 |
| 4,990,358 | 2/1991 | Berta | 427/3 |
| 5,146,730 | 9/1992 | Sadek et al. | 53/454 |
| 5,228,916 | 7/1993 | Berta | 118/30 |

FOREIGN PATENT DOCUMENTS

| 184412 | 5/1907 | Germany | 118/30 |
|---|---|---|---|

*Primary Examiner*—David L. Lacey
*Assistant Examiner*—Laura E. Edwards
*Attorney, Agent, or Firm*—Orrick Herrington & Sutcliffe

[57] ABSTRACT

An apparatus for holding and subsequently releasing a solid compact medicament, such as a caplet. The apparatus has a first and a second member each having an upper and a lower surface. The first and second members each have at least one notch opposed to each other and correspondingly aligned and extending beyond the respective upper and lower surfaces of each member. The first and second members have chambers adjacent to each of the notches, and each of the notches is moveable in the respective chamber of the opposing member so that the opposing notches form a gripping jaw that can move between a first and a second position. When the gripping jaw is in an open first position, it can receive a solid compact medicament, and in a closed second position, the gripping jaw can grip the medicament.

30 Claims, 10 Drawing Sheets

APPARATUS FOR HOLDING SOLID COMPACT MEDICAMENTS DURING COATING PROCESSING

FIELD OF THE INVENTION

The invention relates to an apparatus for holding a solid compact medicament during processing. More particularly, the invention concerns a solid compact medicament holding apparatus in which overlapping portions of the medicament, such as a caplet, are exposed to a coating process to produce a coated solid compact medicament which can resemble a conventional capsule.

BACKGROUND OF THE INVENTION

In the marketing of solid compact medicaments, there is a clear consumer preference for a shiny, capsule-like, single or multiple color solid dosage form that is easy to swallow. Generally, gelatinous coatings have been used to achieve a shiny surface on a solid dosage form, also referred to herein as a caplet, pill, tablet, and the like. Caplets are solid, substantially cylindrical shaped medicaments; pills are solid, substantially round shaped medicaments; and, tablets are solid, substantially spherical shaped medicaments (see for reference Seitz et al., "Tablet Coating", Chapter 12, Page 346, *The Theory and Practice of Industrial Pharmacy*). One method of making caplets which has been used to meet the needs of the pharmaceutical consumer is described and illustrated in U.S. Pat. No. 4,965,089 to Sauter et al, and U.S. Pat. Nos. 4,990,358 and 4,921,108, both to Berta et al. In particular, Sauter '089 and Berta '358 each teaches a method and apparatus for holding and dipping one end portion of a caplet into a gelatin pool and then positioning the caplet so as to dip the uncoated end portion of the caplet into a second gelatin pool of a different color. However, a major drawback of the apparatus and methods taught in these patents is that a constant force spring is relied upon to hold the caplet during the dip coating process and also during caplet transfer to other processing steps, such as drying and packaging. As can be readily appreciated, such a constant spring force could impart a shear force which would be unacceptably large on some abrasion sensitive material included in solid compact medicaments. Acetyl salicylic acid, also known as aspirin, and gelatinous coatings which have not been completely cured, are two examples of abrasion sensitive materials which could be damaged by such shear force.

Furthermore, since existing caplet holders generally rely upon a constant force spring for holding the caplet, they require some sort of mechanical force to load the caplet into and discharge the caplet from the holder, thereby potentially compromising the integrity of the caplet material. For instance, Sauter '089 and Berta '108, each teaches a caplet loading device having a caplet feeder associated with a plunger assembly for mechanically loading and unloading caplets.

Accordingly, there persists a need for a reliable, relatively low maintenance apparatus having few moving parts for holding and releasing a solid compact medicament during processing which does not impart an unacceptably large shearing force on the solid compact medicament, subject the solid compact medicament to lubricant contamination, nor rely upon excessive forces to release the solid compact medicament from the apparatus.

SUMMARY OF THE INVENTION

It is, therefore, the object of the invention to overcome the shortcomings of the prior art. Accordingly, for accomplishing these and other objects of the invention, there is provided, in one aspect of the invention, an apparatus for holding a solid compact medicament during processing comprises first and second members, each having substantially similar surfaces. Moreover, first member comprises a first notch, a portion of which extends beyond the surface, and a first chamber adjacent to the first notch. Similarly, second member comprises a second notch, a portion of which extends beyond the surface, and a second chamber adjacent to the second notch. The portions extending of the notches of first and second members are freely disposed within the chamber of the other, forming opposed notches therein. The opposed notches are therefore enabled to move cooperatively within the chambers. Further, means are provided for urging first and second members from a first position wherein the notches are spaced apart and define an open gripping jaw for receiving and subsequently releasing a solid compact medicament, to a second position wherein the notches, at least partially closed, define a closed gripping jaw engagingly capturing the solid compact medicament for processing.

In another aspect of the invention, an apparatus for holding a solid compact medicament during processing comprises a first member comprising a surface having first and second opposite sides and at least one throughole in the surface. The throughole has an interior wall, a portion of which extends beyond the surface on at least one side of the first member forming a first gripping jaw portion. A second member comprises a surface having third and fourth sides and at least one throughole. The throughole has an interior wall, a portion of which extends beyond the surface on at least one side of the second member forming a second gripping jaw portion. First and second gripping jaw portions are disposed in the throughole of the other for cooperative movement therein. Moreover, means are provided for moving at least one of the gripping jaw portions within the throughole of the other for engaging and subsequently releasing a solid compact medicament.

BRIEF DESCRIPTION OF THE DRAWINGS

The foregoing as well as other objects, features and advantages of this invention will become more apparent from the appended Figures, wherein like numerals denote like elements, and wherein.

DETAILED DESCRIPTION OF THE DRAWINGS

Figure 1:
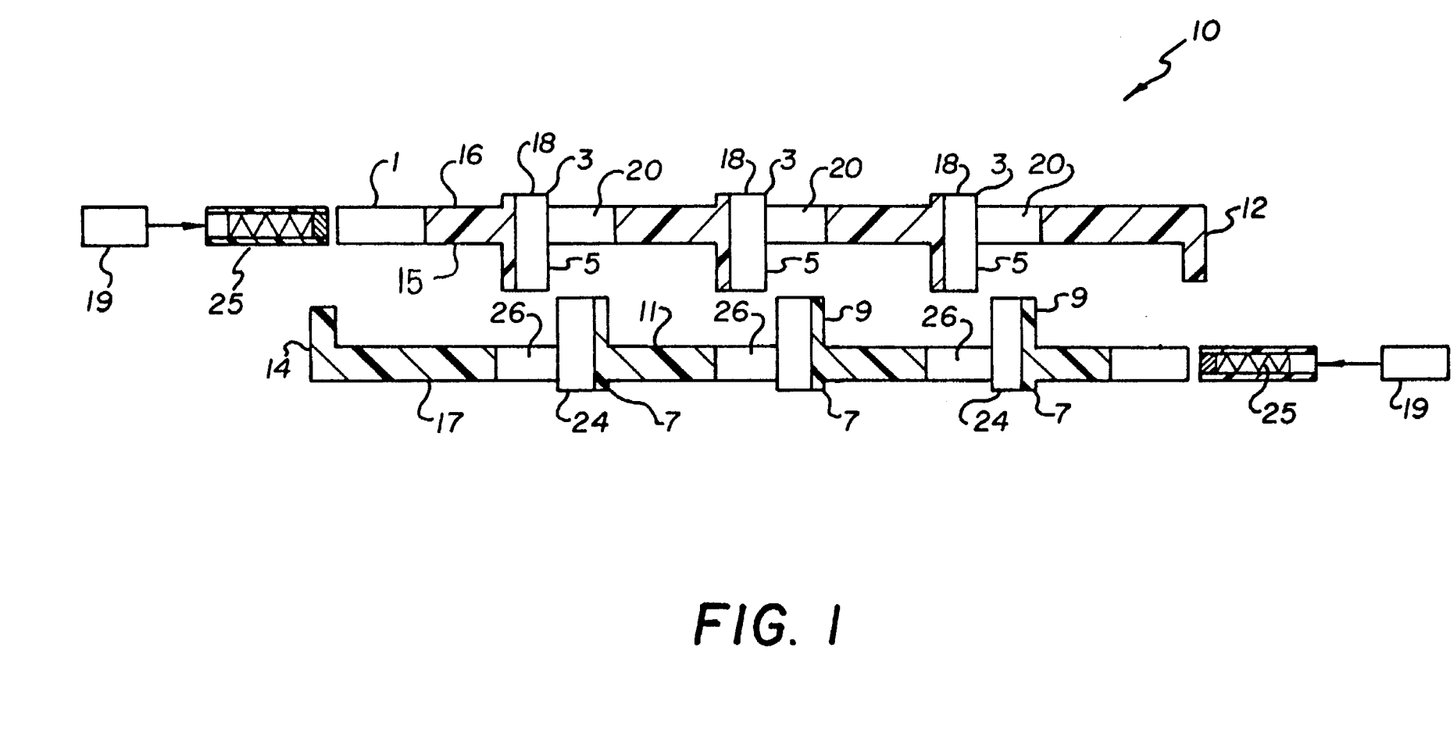
FIG. 1 is an exploded elevational view of the apparatus.

Turning now to the drawings, and more particularly to FIG. 1 there is shown an exploded view of apparatus 10 for processing a solid compact medicament, including caplets, which comprises the preferred embodiment of the invention. Processing of caplets, i.e., the uncoated solid dosage form, generally involves coating (typically dipping or spraying) at least a portion of the caplet. Often one or more layers of clear or colored materials are used in the coating process, for instance, gelatinous materials such as methyl cellulose, calcium alginate or gelatin (See Berta U.S. Pat. No. 4,966, 771). The coated caplet then must be dried and packaged. When one or more coating materials are to be applied to different portions of the caplet, for instance different colored materials on opposite end portions of the caplet, the processes of exposing then coating the uncoated caplet end portion are required. This generally will involve either forcing the caplet through a collet in the manner described in the prior art devices of both Sauter '089 and Berta '358 or, inverting the apparatus of the present invention, as more fully described below, and allowing the caplet to fall freely to a predetermined stop thereby exposing an uncoated portion of the caplet.

Referring again to FIG. 1, apparatus 10 broadly comprises first and second members 12,14, each having substantially similar surfaces 16,17, respectively. Preferably, members 12,14 are substantially plate-like. Member 12 comprises a first notch 18, portions 3,5 of which extend beyond surfaces 16,15, respectively, and a first chamber 20 adjacent to first notch 18. Similarly, second member 14 comprises second notch 24, portions 7,9 of which extend beyond surfaces 17,11 and a second chamber 26 adjacent to second notch 24. Extending portions 5,9 of first and second notches 18,24, respectively, are freely disposed within the second and first chambers 26,20, respectively. In this manner, first and second notches 18,24 are positioned for cooperative lateral movement within chambers 26,20 under the influence of drive means 19, as further described below. The lateral movement or displacement of notches 18,24 is limited by the interior walls of chambers 26,20, respectively. Preferably, notches 18,24 move along a fixed axis within chambers 26,20 respectively so that alignment of members 12,14 is maintained.

Figure 2:
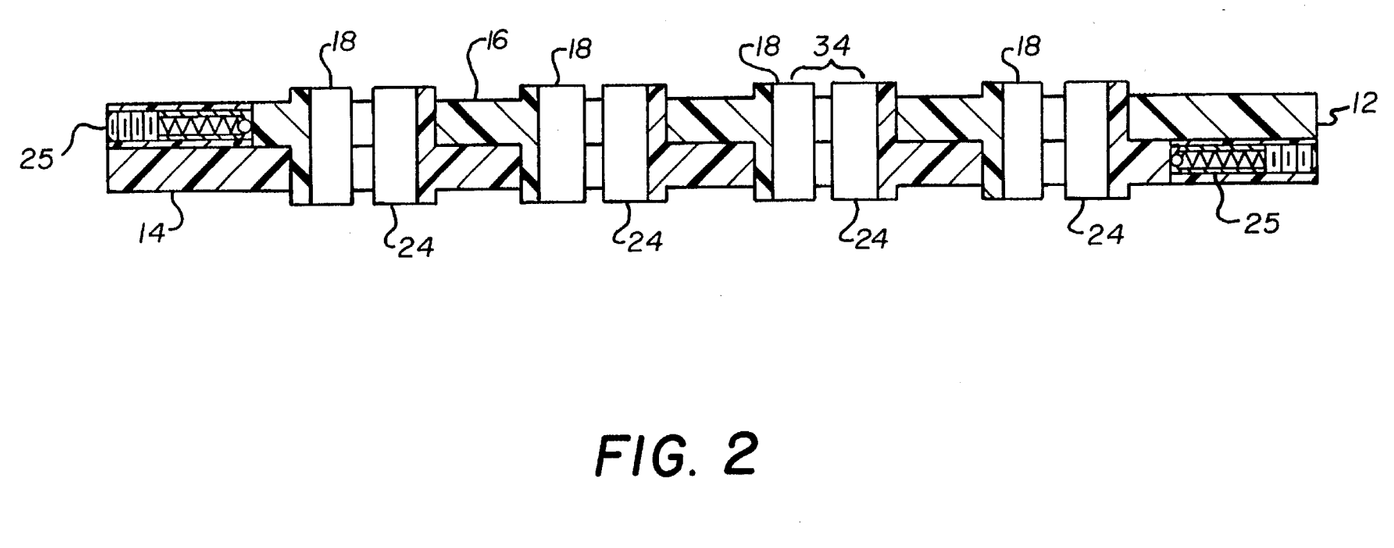
FIG. 2 is a cross sectional view of the apparatus showing the members in a first, open-jawed position along line 2—2 of FIG. 7.
Figure 3:
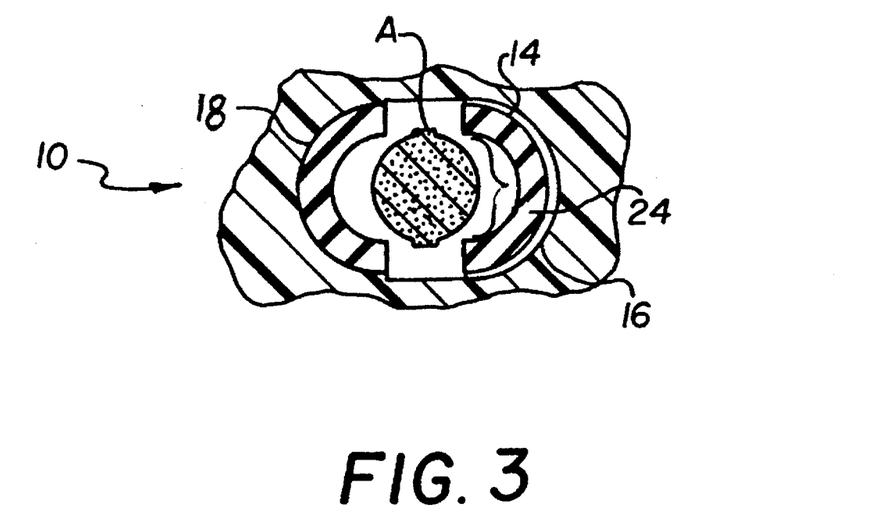
FIG. 3 is a partial plan view of the apparatus in the first, open-jawed position.
Figure 4:
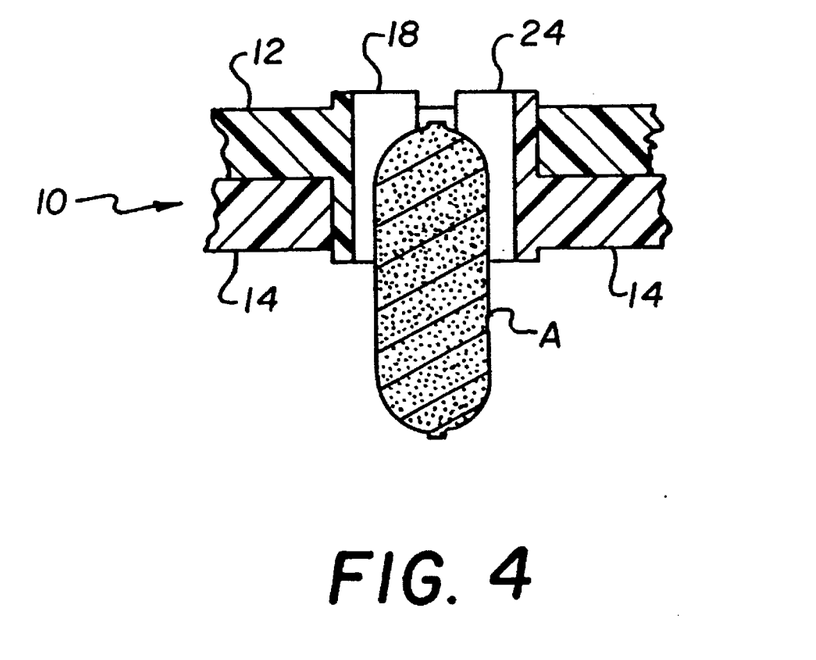
FIG. 4 is an partial cross section view of the gripping jaw in the first, open-jawed position.
Figure 5:
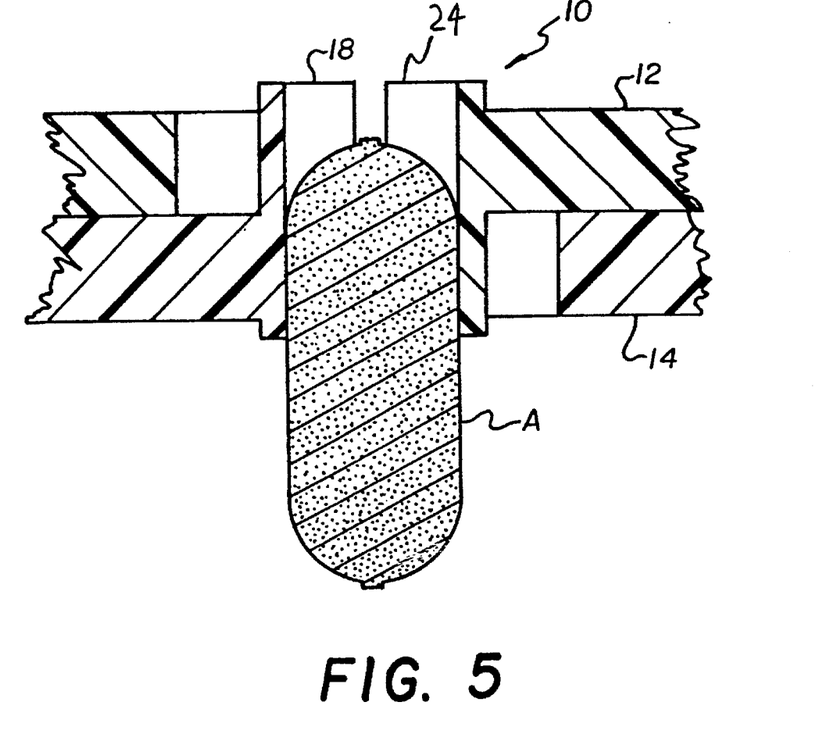
FIG. 5 is a cross sectional view of the apparatus showing the members in a second, closed-jawed position.
Figure 6:
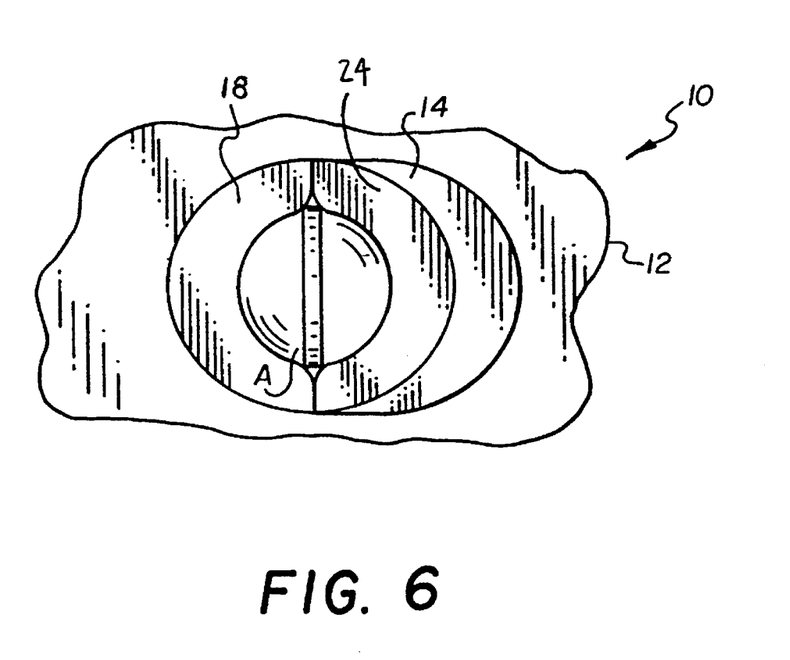
FIG. 6 is a partial plan view of the apparatus in the second, closed-jawed position.

FIGS. 1 & 2 show tension means 25 for moving first and second members 12 and 14 from a first position to a second position, as previously described. The preferred tension means 25 is a spring loaded ball plunger made by Vlier Applied Power Corp., P.O. Box 7269, Burbank, Calif. As indicated, in the first position, the opposed notches 18,24 define an open gripping jaw 34. The opposed notches 18,24 are moved laterally outwardly from one another within cooperating chambers 26,20 for receiving and subsequently releasing a caplet (A), shown clearly in FIGS. 4 & 5. A caplet (A) can then be easily dropped into open gripping jaw 34 by dropping it between the opposed notches 18,24, shown clearly in FIG. 3. In the second position, the opposed notches 18,24 define a closed gripping jaw 34. Opposed notches 18,24 are moved laterally inwardly toward one another for engaging a circumferential portion of the caplet thereby capturing the caplet (A) therein for processing, as best seen in FIGS. 5 & 6. In the latter position, the caplet (A) is constrained from random movement, such as tumbling or disorientation.

Tension means 25, as previously described, cooperates with drive means 19 for displacing members 12,14 from a first to a second position. Tension means 25 biases members 12,14 in the second position, i.e., when the notches 18,24 are at least partially closed for engaging a solid compact medicament. When the gripping jaw 34 is in an open position, drive means 19 maintains an equal opposing force on members 12,14. Notches 18,24 are then spatially separated to receive and subsequently release a solid compact medicament. Thus, when drive means 19 forces gripping jaw 34 open, there is slightly more compression on tension means 25 then when gripping jaw 34 is closed. Those skilled in the art will appreciate that other means within the definition of the invention for displacing members 12, 14 into the first and second positions may be used, such as a leaf spring (not shown).

Figure 7:
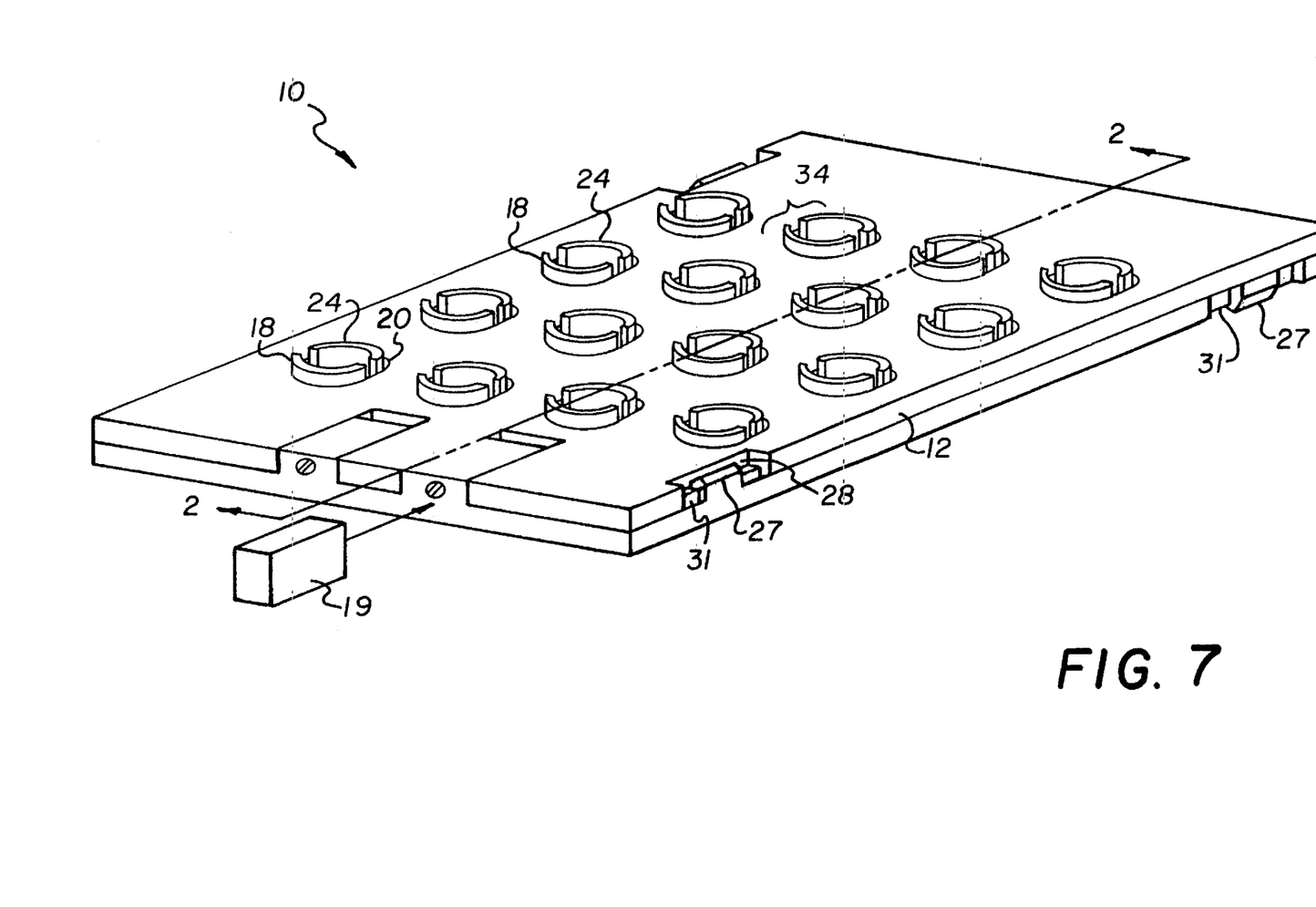
FIG. 7 is a perspective view of the apparatus showing a plurality of gripping jaws.

FIG. 7 shows apparatus 10 alternatively comprising a multiplicity arrangement of gripping jaws 34. Skilled artisans will appreciate that first member 12 may comprise a multiplicity of notches 18 and adjacent chambers 20; and, correspondingly, cooperating second member 14 may comprise a multiplicity of opposing and correspondingly aligned notches 24 and adjacent chambers 26. Moreover, means are provided for retaining members 12,14 in a spaced, substantially parallel relation for lateral movement from a first to a second position. Preferably, at least two diagonally opposed flexible catch members 27 each snap onto rail portion 31 in cavity 28. Catch member 27 is preferably molded in members 12, 14 or it may be attached by any suitable means. Cleaning, assembly and disassembly of members 12,14 are also facilitated with this arrangement.

Figure 9A:
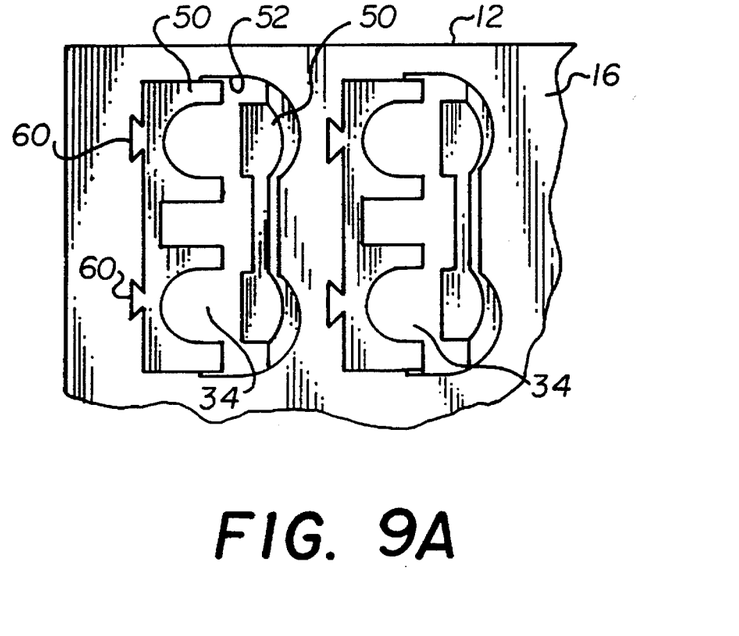
Figure 9B:
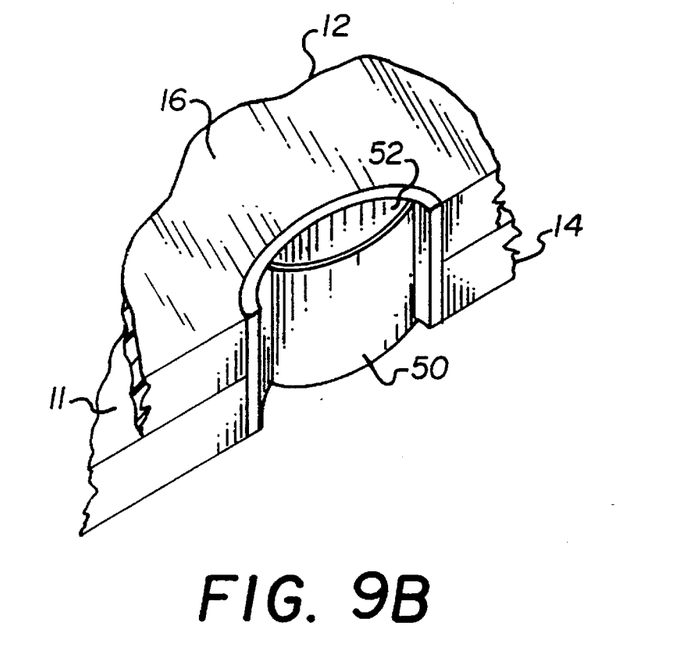
Figure 9C:
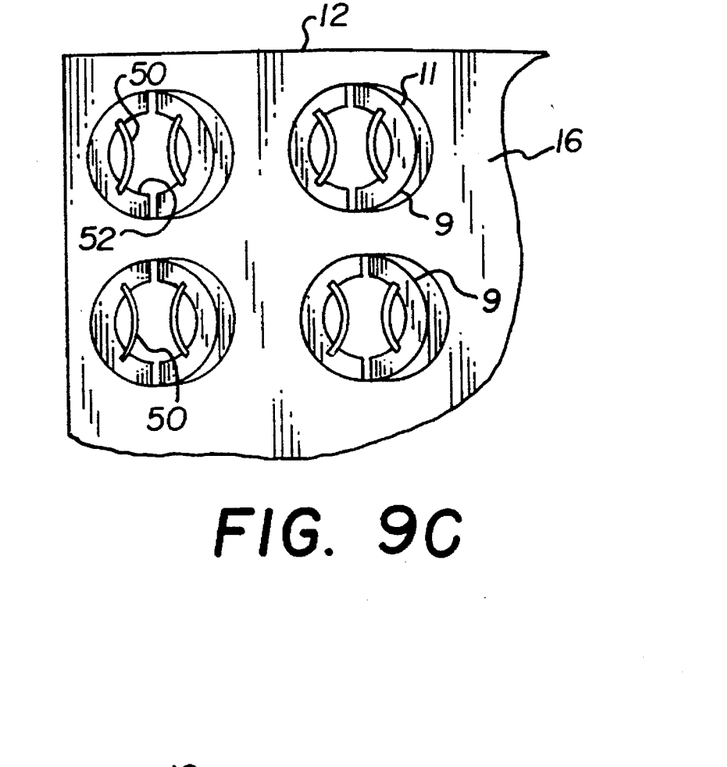
Figure 9D:
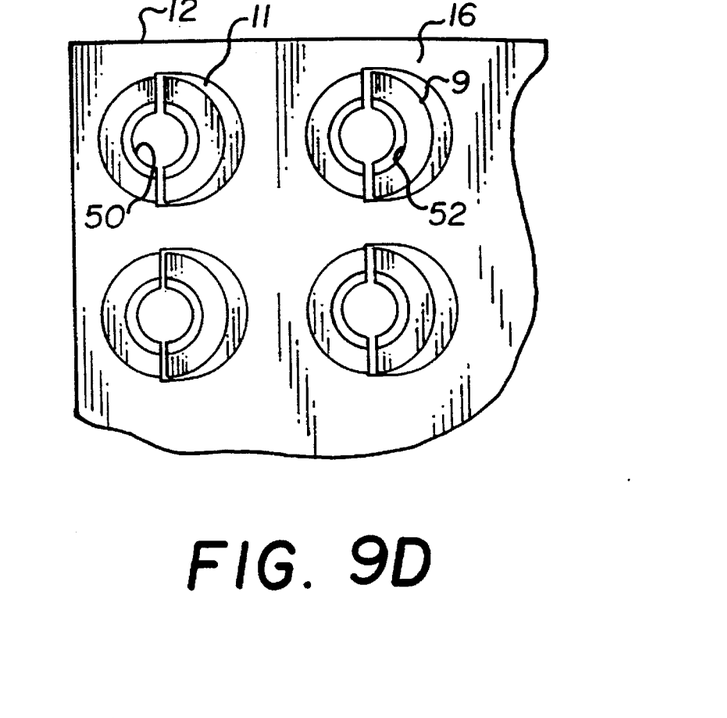
Figure 9E:
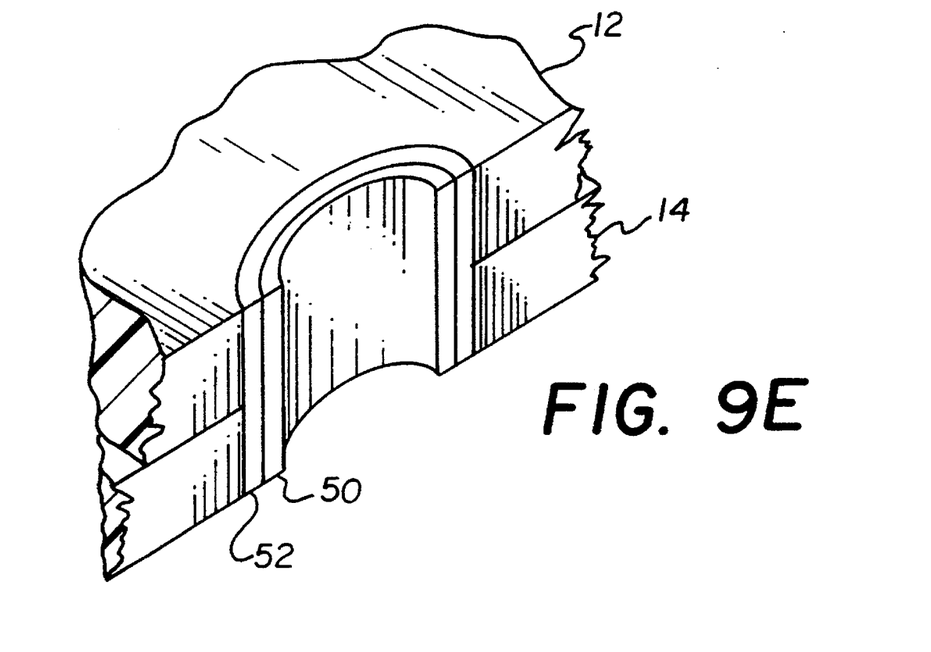
Figure 9F:
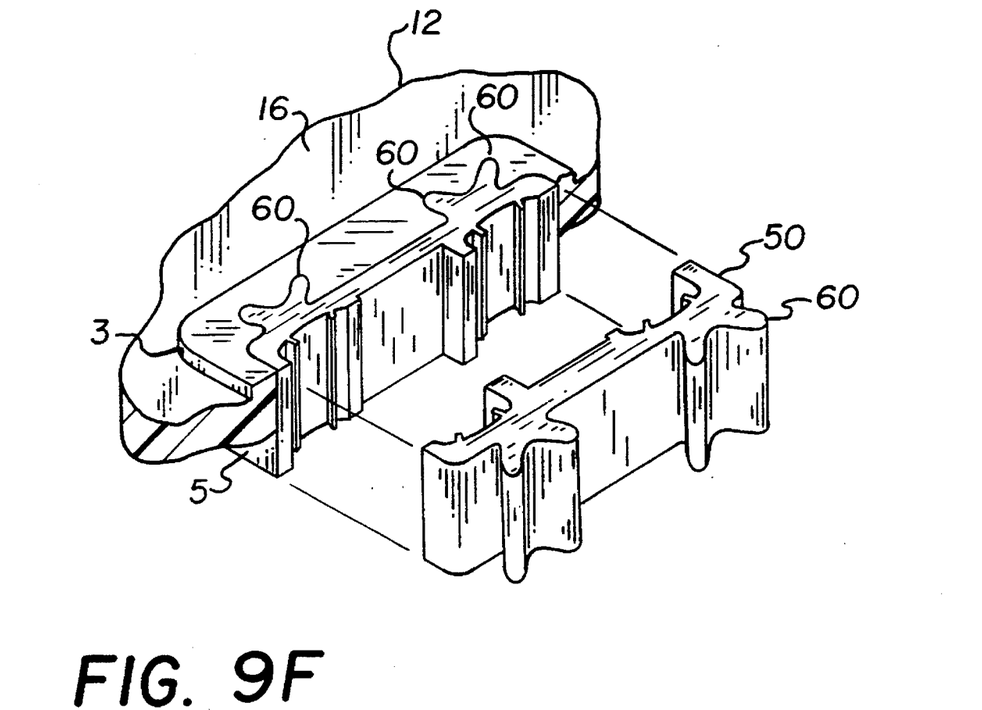

FIGS. 9a–9f show gripping jaw 34 in alternative embodiments of the invention. According to FIGS. 9a–9e, interior wall 52 of gripping jaw 34 comprises various arrangements of a compliant material 50. Compliant material layer 50 is preferably adhesively mounted onto interior wall 52 or, it may be mounted by any suitable means, such as by interlocking layer 50 to interior wall 52, as illustrated in FIGS. 9a and 9f. One way that layer 50 can be interlocked with interior wall 52 is by providing a compliant layer 50 comprising at least one wall mounting portion 60, for example a dove tail, and a corresponding slot portion (not shown) in interior wall 52 for frictionally receiving the dove tail portion 60. Generally, compliant material 50 is shaped to securely conform with a circumferential portion of the medicament captured in gripping jaw 34 so as to prevent rotational or translational movement. The inventors deem that each of the arrangements illustrated perform substantially similar, although the interlocked arrangement (FIG. 9f) is preferred. While just about any compliant material layer 50 within the definition of the invention may be used, the inventors generally prefer a moldable thermoplastic rubber material, such as SANTOPRENE® made by Monsanto Corporation of St. Louis, Mo.

Figure 8A:
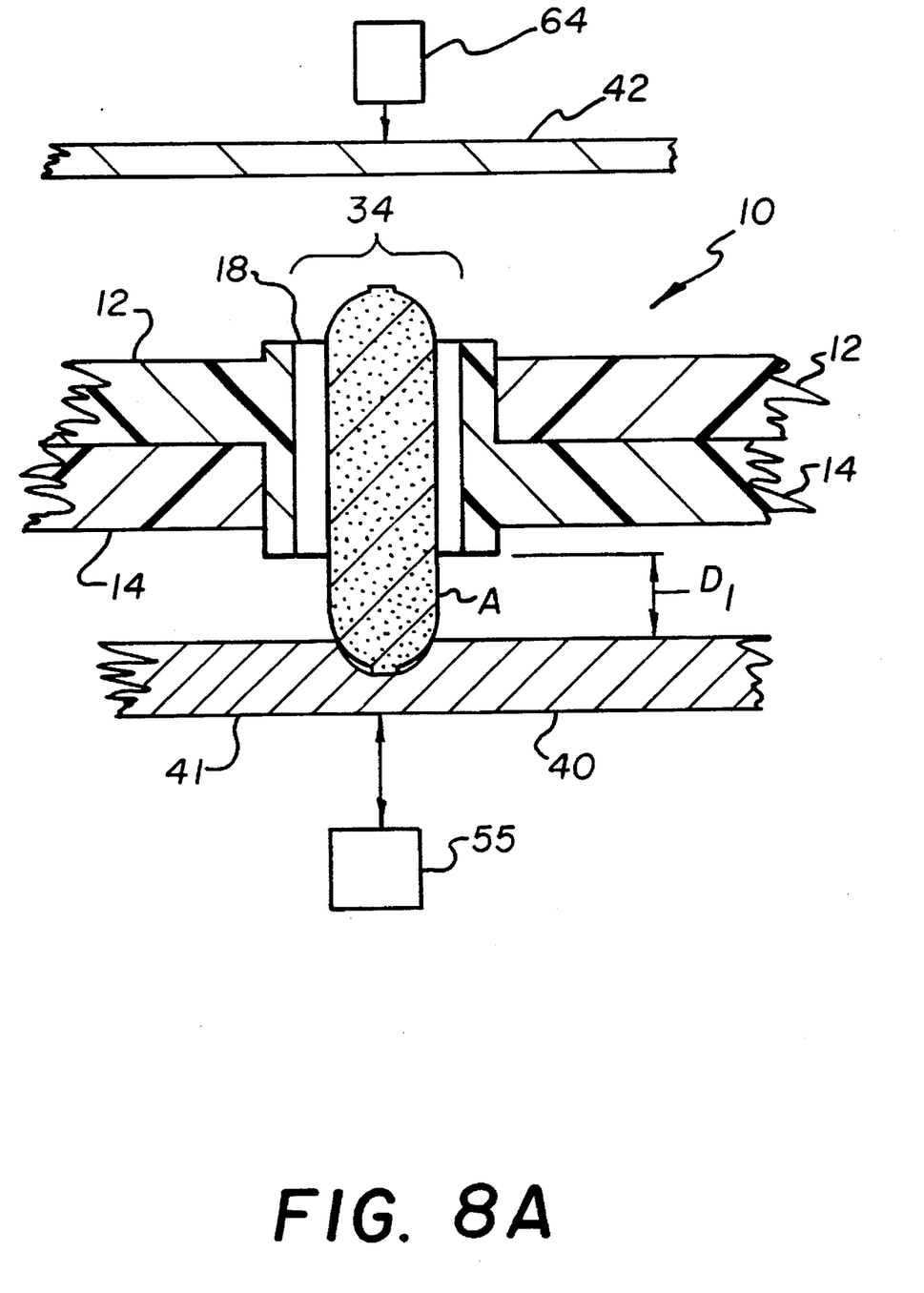
FIG. 8a–8b are cross-sectional views of an alternative embodiment of the invention; and, FIG. 9a–9f are partial plan views of the apparatus showing the gripping jaw having various arrangements of compliant material layer therein.
Figure 8B:
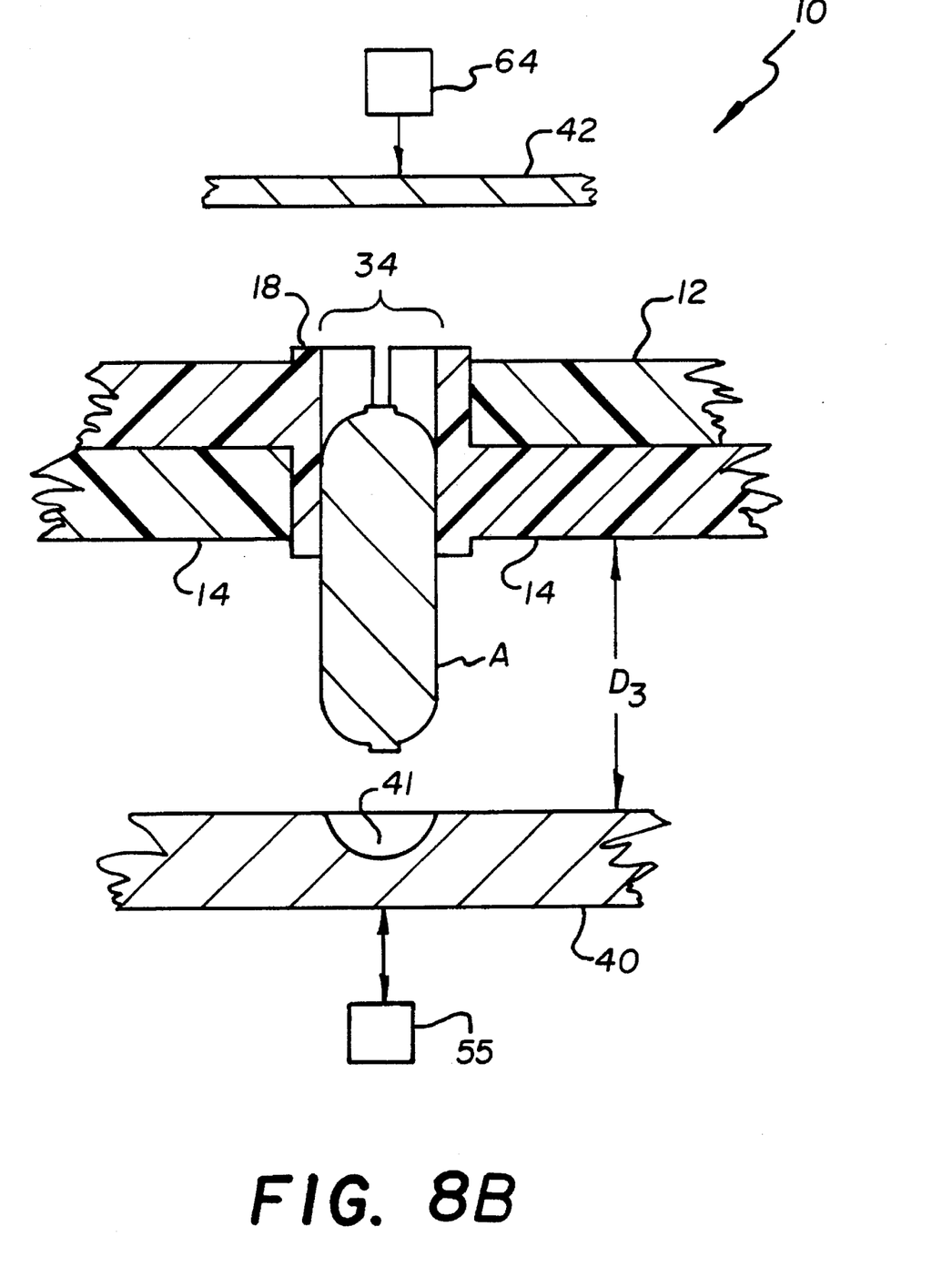

Turning to FIGS. 8a–8b, in another embodiment of the invention, apparatus 10 is shown comprising both means for precisely positioning a predetermined portion of the caplet (A) and means for initiating disengagement of caplet (A) from gripping jaw 34, respectively. Preferably, a stop plate 40 positioned beneath the lengthwise axis of gripping jaw 34 is provided so that caplets or solid compact medicaments of various lengths and coating formats can be accommodated. According to FIG. 8b, stop plate 40 preferably comprises a depression 41, correspondingly shaped to an end portion of the solid compact medicament (A) and, alignably positioned beneath the gripping jaw 34 for resisting lateral movement of the caplet upon contact with stop plate 40. Further, stop plate 40 is movably adjustable, preferably under the influence of second drive means 55, relative to gripping jaw 34.

Referring again to FIGS. 8a–8b, means are provided for initiating disengagement of caplet (A), if required due to sticking, from gripping jaw 34. Some small number of caplets (A) may require urging to initiate free-fall through the open gripping jaw 34 during, for instance, large batch processing. To initiate disengagement of a reluctant caplet (A) from an open gripping jaw 34, a disengagement member 42 is preferably used. According to FIG. 8b, disengagement member 42 is positioned above the gripping jaw 34 and is brought into pressing contact, preferably under the influence of a third drive means 64, with an end portion of the caplet (A). In this manner, the downward displacement of caplet (A) through gripping jaw 34 is initiated, and once initiated, the caplet (A) starts its free-fall movement through open gripping jaw 34 without the requirement of additional force. Those skilled in the art will appreciate that other means may be used for initiating displacement of solid compact medicament (A) downwardly through gripping jaw 34, such as, by vibration means, air pressure or vacuum.

Accordingly, an important advantageous effect of the present invention is that it provides a reliable, low maintenance apparatus for holding a solid compact medicament during processing and subsequently releasing the solid compact medicament without contamination or damage.

The invention has therefore been described with reference to certain embodiments thereof, but it will be understood that variations and modifications can be effected within the scope of the invention.

| Parts List | |
| --- | --- |
| Caplet | A |
| Portions of First Notch | 3,5 |
| Portions of Sec. Notch | 7,9 |
| Apparatus | 10 |
| First and Second Members | 12, 14 |
| Lower Surface (First Member) | 15 |
| Upper Surface (First Member) | 16 |
| Lower Surface (Second Member) | 17 |
| Upper Surface (Second Member) | 11 |
| First Notch | 18 |
| Chamber (First Member) | 20 |
| Second Notch | 24 |
| Chamber (Second Member) | 26 |
| Flexible catch member | 27 |
| Cavity | 28 |
| Rail portion | 31 |
| Gripping Jaw | 34 |
| First drive Means (Spring) | 19 |
| tension means | 25 |
| Stop Plate | 40 |
| Depression | 41 |
| Disengagement Member | 42 |
| Complaint material Layer | 50 |
| Interior Wall Jaw (34) | 52 |
| Dove tail portion | 60 |
| Second Drive means | 55 |
| Third Drive means | 64 |

Having described our invention in sufficient detail to enable those skilled in the art to make and use it, we claim and desire to secure Letters Patent of the United States for:

1. Apparatus for holding a solid compact medicament to be coated comprising:

a first member comprising a first notch and a first chamber adjacent said first notch, said first notch having a portion extending beyond a lower surface of said first member;

a second member comprising a second notch and a second chamber adjacent said second notch, said second notch having a portion extending beyond an upper surface of said second member; and means for displacing said first and second members from a first position wherein said opposed notches are spaced apart thereby defining an open gripping jaw for receiving and subsequently releasing a solid compact medicament, to a second position wherein said opposed notches are at least partially closed for engaging a circumferential portion of the solid compact medicament.

2. The apparatus recited in claim 1 further comprising means, cooperating with said second member, for positioning a predetermined portion of the solid compact medicament for processing.

3. The apparatus recited in claim 2 wherein said positioning means is a stop plate spaced a predetermined distance from said gripping jaw.

4. The apparatus recited in claim 3 wherein said stop plate is adjustable relative to said gripping jaw.

5. The apparatus recited in claim 3 wherein said stop plate is provided with a depression aligned with a longitudinal axis of the gripping jaw.

6. The apparatus recited in claim 5 wherein said depression is sized to accommodate an end portion of the solid compact medicament.

7. The apparatus recited in claim 1 further comprising means, cooperating with said first member, for urging said solid compact medicament from said gripping jaw.

8. The apparatus recited in claim 7 wherein said urging means is a disengagement member.

9. The apparatus recited in claim 1 wherein said gripping jaw comprises an interior wall, said interior wall being provided with a compliant material layer for engaging the solid compact medicament.

10. The apparatus recited in claim 9 wherein said compliant material layer is a rubber material.

11. The apparatus recited in claim 1 wherein an interior portion of said gripping jaw is provided with a compliant member mounted thereon for graspably securing a portion of said solid compact medicament.

12. Apparatus for holding a solid compact medicament to be coated comprising:

a first member comprising a surface having first and second opposite sides and at least one throughole in said surface, said at least one throughole having an interior wall, a portion of said interior wall extending beyond the surface on at least one side of said first member forming a first gripping jaw portion;

a second member comprising a surface having third and fourth sides and at least one throughole, said at least one throughole of said second member having an interior wall, a portion of said interior wall extending beyond the surface on at least one side of said second member forming a second gripping jaw portion;

wherein said first and second gripping jaw portions being disposed in the throughole of the other for cooperative movement therein together defining a gripping jaw; and, means for moving at least one of said gripping jaw portions within the throughole of the other for engaging and subsequently releasing a solid compact medicament.

13. The apparatus recited in claim 12 further comprising means, cooperating with said second member, for positioning a predetermined portion of the solid compact medicament for processing.

14. The apparatus recited in claim 13 wherein said positioning means is a stop plate spaced a predetermined distance from said gripping jaw.

15. The apparatus recited in claim 14 wherein said stop plate is adjustable relative to said gripping jaw.

16. The apparatus recited in claim 14 wherein said stop plate is provided with a depression aligned with a longitudinal axis of the gripping jaw.

17. The apparatus recited in claim 12 wherein said depression is sized to accommodate an end portion of the solid compact medicament.

18. The apparatus recited in claim 12 further comprising means, cooperating with said first member, for urging said solid compact medicament from said gripping jaw.

19. The apparatus recited in claim 18 wherein said urging means is a disengagement member.

20. The apparatus recited in claim 12 wherein said gripping jaw comprises an interior wall, said interior wall being provided with a compliant material layer for engaging the solid compact medicament.

21. The apparatus recited in claim 20 wherein said compliant material layer is a rubber material.

22. The apparatus recited in claim 12 wherein an interior portion of said gripping jaw is provided with a compliant member mounted thereon for graspably securing a portion of said solid compact medicament.

23. An apparatus for holding a solid compact medicament to be coated comprising:

- a first member having a first notch, a first chamber adjacent said first notch, and a lower surface, said first notch having a portion extending beyond said lower surface of said first member;
- a second member having a second notch, a second chamber adjacent said second notch, and an upper surface, said second notch having a portion extending beyond said upper surface of said second member;
- the first and second members being arranged in opposition with said portion of the first notch being movable within the second chamber; the portion of the second notch being movable within the first chamber and the portions forming opposed notches so that said opposed notches can move cooperatively within said chambers; said opposed notches being movable between a first position and a second position cooperatively with the movement of the first and second members, the opposed notches in said first position being spaced apart defining an open gripping jaw for receiving and subsequently releasing a solid compact medicament, said gripping jaw having a longitudinal axis, and in the second position said opposed notches being at least partially closed for engaging a circumferential portion of said solid compact medicament; and
- a spring member connected to the first and second members such that said spring member biases the first and second members in the second closed position.

24. The apparatus set forth in claim 23 further comprising a stop plate cooperating with said second member for positioning a predetermined portion of said solid compact medicament, said stop plate spaced a predetermined distance from said gripping jaw.

25. The apparatus set forth in claim 24 wherein said stop plate is adjustable relative to said gripping jaw.

26. The apparatus set forth in claim 24 wherein said stop plate is provided with a depression aligned with said longitudinal axis of said gripping jaw.

27. The apparatus set forth in claim 26 wherein said depression is sized to accommodate said solid compact medicament.

28. The apparatus set forth in claim 23 further comprising a disengagement member cooperating with said first member for urging said solid compact medicament from said gripping jaw.

29. The apparatus set forth in claim 23 wherein said gripping jaw further comprises an interior wall, said interior wall being provided with a compliant material to engage the solid compact medicament.

30. The apparatus set forth in claim 29 wherein said compliant material is a rubber material.

* * * * *